United States Patent [19]

Walsh

[11] 3,868,529

[45] Feb. 25, 1975

[54] HALOGEN LAMP CONTAINING NICKEL-PLATED PARTS

[75] Inventor: LaVerne E. Walsh, South Euclid, Ohio

[73] Assignee: General Electric Company, Schenectady, N.Y.

[22] Filed: May 24, 1973

[21] Appl. No.: 363,340

[52] U.S. Cl................. 313/222, 313/223, 313/271, 313/318
[51] Int. Cl. ............................................ H01k 1/20
[58] Field of Search ........................ 313/222–223, 313/271, 318

[56] References Cited
UNITED STATES PATENTS

| | | | |
|---|---|---|---|
| 2,069,638 | 2/1937 | Wright | 313/318 |
| 2,200,954 | 5/1940 | Glassberg | 313/318 |
| 2,883,571 | 4/1959 | Fridrich et al. | 313/223 |
| 3,263,113 | 7/1966 | Schroder | 313/223 |

Primary Examiner—Alfred E. Smith
Assistant Examiner—Wm. H. Punter
Attorney, Agent, or Firm—Emil F. Sos, Jr.; Lawrence R. Kempton; Frank L. Neuhauser

[57] ABSTRACT

An incandescent lamp of the tungsten-halogen type contains component parts such as nickel-plated steel contact clips and nickel-plated copper posts which are exposed to a halogen atmosphere but do not react with the halogen gas and therefore are not transported and deposited on the bulb wall.

3 Claims, 3 Drawing Figures

PATENTED FEB 25 1975 3,868,529

3,868,529

HALOGEN LAMP CONTAINING NICKEL-PLATED PARTS

BACKGROUND OF THE INVENTION

1. Field of the Invention

The invention relates generally to incandescent electric lamps containing a small quantity of halogen fill gas. More particularly, the invention relates to a halogen lamp containing metal lamp parts, which are exposed to the halogen gas, which are made of nickel-plated iron and nickel-plated copper.

2. Description of the Prior Art

Since the discovery of the first halogen lamp, the iodine lamp, Fridrich U.S. Pat. No. 2,883,571, it has been believed that only refractory metal parts could be used in halogen lamps. Typical internal lamp parts, other than the filament, used in halogen lamps are spiral supports, lead-in conductors, side rods, contact posts, contactor clips and side channels. Most parts used in iodine and bromine lamps have been made of tungsten, and in a few cases, molybdenum has been successfully used.

However, the use of metals such as steel and copper, which are less expensive than tungsten and molybdenum, has heretofore been unsuccessful. In fact, certain prior art patents, such as Audesse, et al. U.S. Pat. No. 3,225,247, Column 2, lines 50–54, specifically state that, in an iodine lamp, metals other than tungsten will be deposited on and in turn discolor the bulb wall.

SUMMARY OF THE INVENTION

It is therefore an object of the invention to manufacture a tungsten-halogen lamp. A further object of the invention is to utilize the tungsten-halogen cycle in an envelope of inexpensive high temperature glass. Still another object of the invention is to make a halogen lamp which uses comparatively inexpensive lamp parts made of steel and copper.

The objects of the invention are accomplished by using a high temperature glass for the lamp envelope such as Corning Glass 7740. To this glass is sealed nickel-plated copper posts which have a glass bead around an unplated portion of the post. The glass material used for the bead can be General Electric Glass 776. Side channels are then placed inside the plated copper posts, and contact clips are inserted into the nickel-plated copper posts to force the posts and the side channels into electrical contact.

The contact clips are made of steel and are also nickel-plated. It has been found that a plating thickness of 0.7 mils gives the best results; however, the plating thickness may be reduced to as low as 0.3 mils. An inner nickel sleeve is sometimes inserted inside the copper post before the side channel and contact clip to prevent scratching the nickel from the post.

DESCRIPTION OF THE PREFERRED EMBODIMENTS

Figure 1:
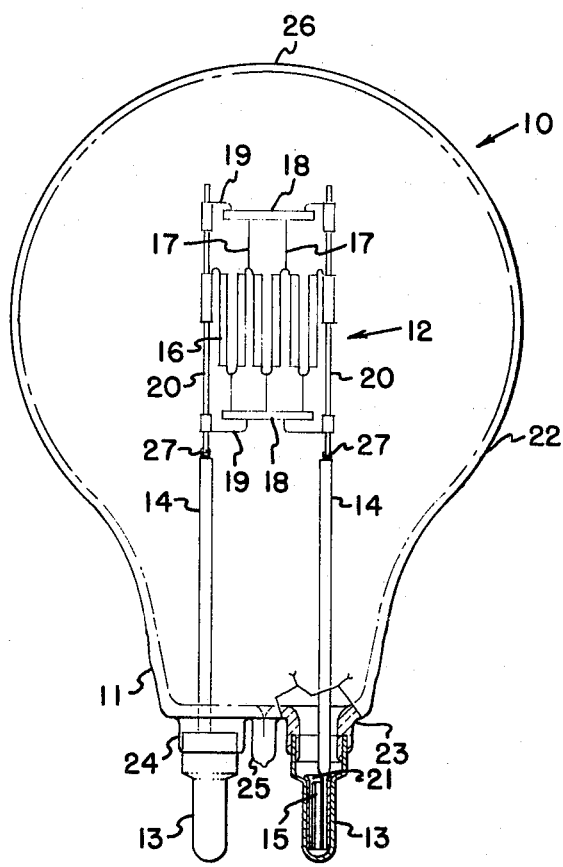
FIG. 1 is an elevation view partly in section of the lamp of the invention.

Referring to FIG. 1 of the drawing, lamp 10 is comprised of envelope 11, filament mount 12, posts 13, side channels 14 and contact clips 15. Filament mount 12 is made up of a planar filament 16 which is stretched to the desired tension by hooks 17 which are embedded in quartz rods 18. Guides 19 are attached to side rods 20 and quartz rods 18 so that the planar filament 16 can be positioned at a predetermined location with respect to the posts. The entire mount assembly 12 is then crimped and welded to side channels 14. Nickel slipover coils 27 are positioned at the juncture of the side channels and mount to give added electrical conductivity.

Electrical contact between posts 13 and side channels 14 is made by inserting contact clip 15 inside the assembled post and channel. Side channel 14 is forced to make contact with the nickel-plated wall of the post because the diameter of the contact is greater than the inside diameter of the post, thereby forming an interference fit. In another embodiment of the invention, a thin nickel sleeve 21 is first inserted inside post 13, and then the channel and contact clip are inserted inside the sleeve. In this manner, the post, sleeve and channel are forced into contact with each other. The reason for using a thin nickel sleeve is to prevent the possible scratching of the plated post surface by the channel or contact when these pieces are assembled.

Envelope 11 is comprised of bulb 22, molded glass flare 23 and sealing beads 24. A typical high temperature glass used for the bulb and molded glass flare is known as Corning Glass 7740 or General Electric Glass 774. Sealing beads 24, which are presealed to the copper posts before plating, are made of General Electric Glass 776. The walls of post 13 are tapered to a comparatively thin section to permit the sealing bead to form a hermetic seal with the copper. Thin tapered sections of copper are necessary because of the difference in coefficients of expansion between copper and glass.

In assembling lamp 10, the nickel-plated copper post 13, with sealing bead 24 already attached, is fused or sealed to molded glass flare 23. Side channel 14 is then positioned inside the nickel-plated post, and contact clip 15 is inserted into the post to force the channel and post into electrical contact. Overwind coil 27 is placed on the channels, and filament mount 12 is crimped and welded to the side channels. Bulb 22 is then positioned over molded glass flare 23, and the two glass surfaces are sealed through the application of heat from a source not shown.

Part of molded glass flare 23 is an exhaust tube, the tipped-off residue of which is shown at 25. The inside of the lamp is first evacuated or exhausted, and then the lamp interior is filled with an inert gas and a halogen. In the case of the particular lamp shown in FIG. 1, the envelope is filled with a gas mixtures of 99.25 percent nitrogen plus 0.5 percent $CH_3Br$ plus 0.25 percent oxygen at a fill pressure of approximately 700 ± 25 torr which is approximately equal to one atmosphere.

The lamp shown in FIG. 1 is a 5,000-watt studio lamp used for television and movie studio lighting. It has a color temperatures of 3,200°K at a voltage of 120 volts and has a light output equal to 143,000 lumens. In one application, the lamp is used in a fixture which allows the light to be concentrated as in a spotlight or to be dispersed as in a floodlight depending upon the light source location with respect to the fixture.

Because of the widespread used of color in today's movies and television, light output, lumens, has become very important. Accordingly, any discoloration of the bulb wall would reduce the lumens, a situation which continues to deteriorate over the life of the lamp. Of equal importance is the cost of lighting including the initial lamp cost. Many of the lamps of the prior art utilized quartz as an envelope material and molybdenum cup seals to form electrical contact. Also used in prior art lamps were parts made of materials such as tungsten or molybdenum because it was believed that other metal parts would react with the halogen and be deposited permanently on the bulb wall, thereby reducing the lumens over the life of the lamp.

Lamps which did not use quartz, molybdenum cup seals, and tungsten and molybdenum parts did not have the advantage of the tungsten-halogen cycle. Although these lamps were less expensive, the bulb wall would blacken and reduce the lumen output, thereby necessitating removal and replacement.

In an effort to reduce the cost of lamps and still maintain the advantages of the halogen cycle, various experiments were conducted. One such experiment was an attempt to use the bromine cycle in a lamp envelope of high temperature glass, along with copper posts and stainless steel contact clips. The result was that copper would deposit on the bulb wall at location 26 when the lamp was burned base down. The color of the deposit was reddish initially, and as the lamp continued to burn, it also began to blacken. It is believed that the copper deposited on the bulb wall went through an ion exchange process with the sodium ions in the high temperature glass. The sodium in the lamp atmosphere then combined with the halogen, thereby disabling the halogen cycle with the result that tungsten began to deposit on the bulb wall. Furthermore, the steel contact clips began to shown an etching and pitting presumably from bromine attack.

Figure 2:
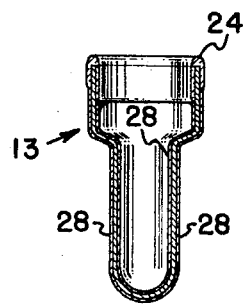
FIG. 2 is a cross-section view of a nickel-plated post.
Figure 3:
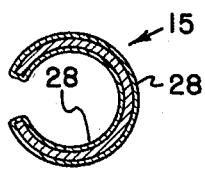
FIG. 3 is an end view of a plated contact clip.

As indicated earlier, the use of copper and steel parts were desirable from an economic standpoint. Accordingly, a way to incorporate these inexpensive parts and effectively maintain a halogen cycle was pursued. In one attempt, the copper and steel parts, as shown in FIGS. 2 and 3, were plated with nickel. The plating thickness 28 shown in FIGS. 2 and 3 is greatly exaggerated.

At first, the nickel thickness, indicated by the numeral 28, was 0.3 mils. Although this thickness can be used to make the lamp of the invention, there is a danger that side channels 14 and clip 15 will scrape the nickel coating from the copper and hinder the halogen cycle. Special care must be exercised in assembling these parts when 0.3-mil plating is used. The next plating thickness, 28, tried was that of 0.7 mils. Lamps manufactured with the 0.7-mil-thick nickel on the copper post and steel clamping clip performed satisfactorily. Little, if any, deposits of copper, iron or tungsten were detected on the bulb wall over the life of the lamp.

A possible explanation of why the nickel plating successfully resisted halogen attack or reaction is because the copper and steel were sufficiently far from the center of the filament and, accordingly, at a temperature lower than the temperature required for a nickel-bromine, iodine reaction. Although it is difficult to measure exact temperatures of lamp parts, certain measurements indicate that the outside temperature of the nickel-plated copper post varied from approximately 275°C to 302°C. The distance between the center of the planar filament and the sealing bead in the lamp base of the example is approximately 165 mm.

Another factor which affects the temperature of the lamp parts in the post area is the position of the lamp, i.e., base down, vertical, or at an angle with the vertical axis. The seal temperature of a lamp burning in a vertical position was recorded as being 294°C, and the seal temperature of a lamp at an angle of 80° with the vertical was recorded as being 302°C.

A variation of the invention mentioned earlier is the use of a thin nickel sleeve inside the nickel-plated copper post. By inserting a nickel sleeve of approximately 5-mil thickness into the copper post prior to the inserting of the side channel and contact clip, the danger of scraping off the nickel coating from the copper is eliminated because any abrasive scraping will take place on the sleeve and not on the plated post.

What I claim as new and desire to secure by Letters Patent of the United States is:

1. An incandescent lamp of the tungsten-halogen type comprising an envelope of high temperature glass, a fill gas containing a small quantity of a halogen gas, said halogen gas selected from the group consisting of iodine and bromine, nickel-plated copper posts hermetically sealed to said envelope, said nickel-plated copper posts located at a distance from the filament such that the external temperature of the posts does not exceed approximately 302°C, side channels, means for electrically connecting said nickel-plated copper posts and said side channels, a tungsten filament, and means for electrically connecting the filament and the side channels.

2. An incandescent lamp of the tungsten-halogen type comprising an envelope of high temperature glass, a fill gas containing a small quantity of a halogen gas, said halogen gas selected from the group consisting of iodine and bromine, nickel-plated copper posts hermetically sealed to the envelope, a thin nickel sleeve positioned inside said posts such that the nickel-plated copper walls of the posts are protected from abrasion, side channels electrically connected to the posts and sleeves through the spring action of a nickel-plated steel contact clip which forms an interference fit inside the sleeve, said nickel-plated copper posts being located a distance from the filament such that the external temperature of the posts does not exceed approximately 302°C.

3. An incandescent lamp as claimed in claim 2 wherein said nickel plating has a thickness which is equal to or greater than 0.3 mils.

* * * * *